Sept. 8, 1931. F. R. MOTT 1,822,106
FUEL BURNING MEANS FOR COOKING VESSELS
Filed June 4, 1928 2 Sheets-Sheet 1
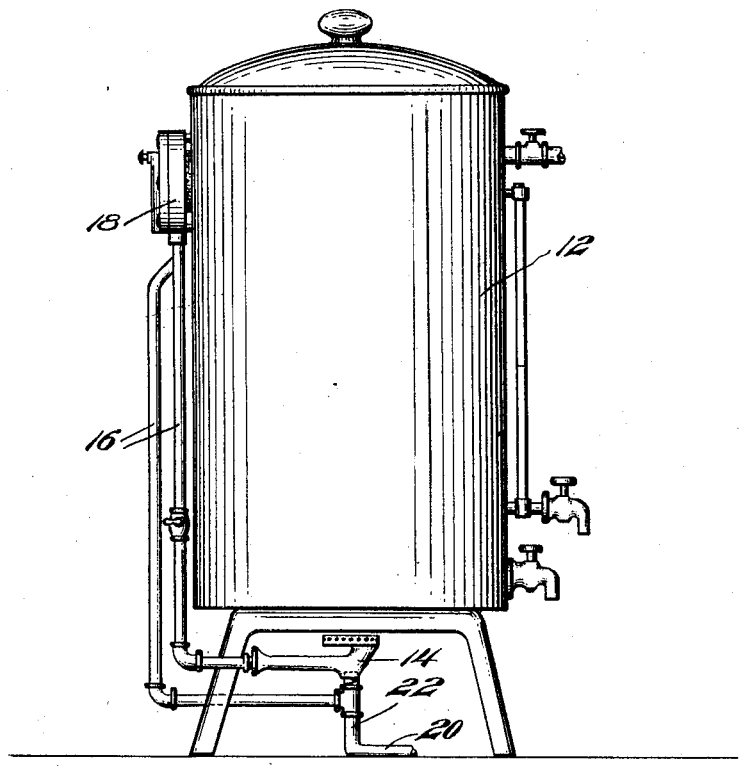

Sept. 8, 1931.  F. R. MOTT  1,822,106
FUEL BURNING MEANS FOR COOKING VESSELS
Filed June 4, 1928   2 Sheets-Sheet 2
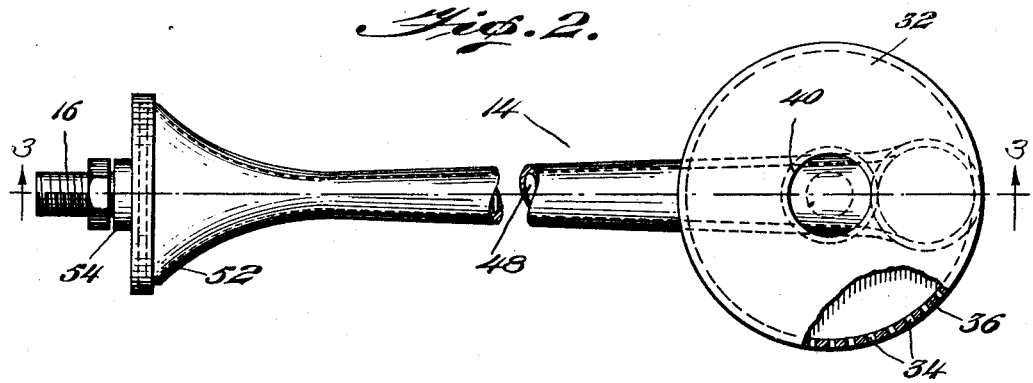
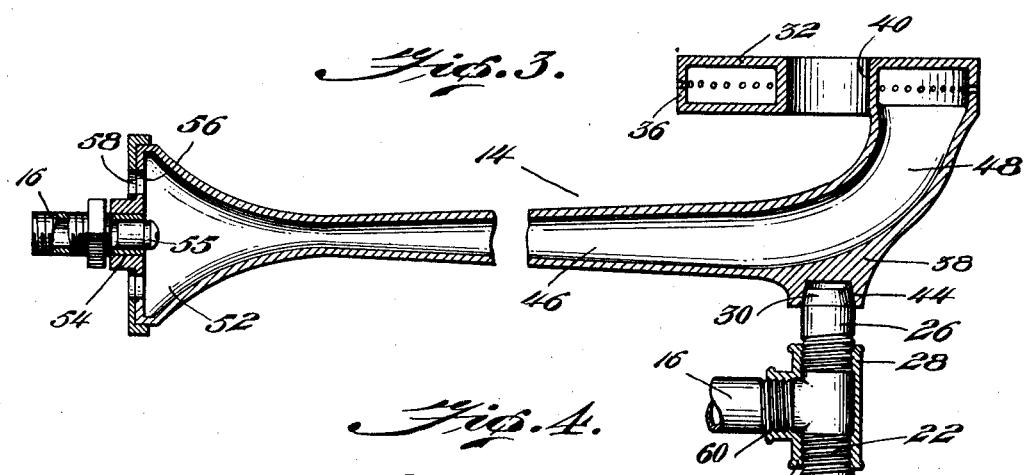
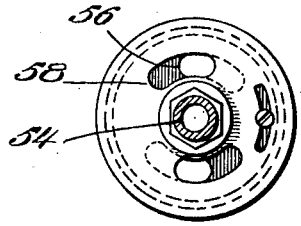
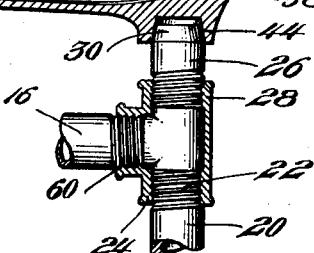
Inventor
Frederick R. Mott
By Thomas A. Jenkins Jr.
Attorney Patented Sept. 8, 1931

1,822,106

UNITED STATES PATENT OFFICE

FREDERICK R. MOTT, OF SEEKONK, MASSACHUSETTS

FUEL BURNING MEANS FOR COOKING VESSELS

Application filed June 4, 1928. Serial No. 282,682.

My invention relates to cooking vessels and includes an improved type of burner means for supplying the burning fluid thereto, particularly in conjunction with a thermostatic valve for regulating the supply of burning fluid thereto such as is described in my co-pending application for patent on Cooking vessels, Serial No. 282,683 filed of even date herewith.

While my invention is adapted for use in any type of normally closed cooking vessel, it is specifically adapted for use in heating a coffee urn of the type that is standard equipment for restaurants, lunch wagons, etc.

An object of my invention is to provide a burner for use in coffee urns in which it is possible to vertically adjust the height thereof to bring it into the desired spaced relationship with the base of the coffee urn, steam table or other cooking vessel employed.

I also provide in a burner of this description, a mixing chamber for mixing the gas or primary air and discharging the mixture through a burner plate preferably radially outwardly and provide improved means to admit secondary air to the center of said burner to provide for burning purposes a down draft and an up draft of secondary air around the circumference of the burner.

These and such other objects of my invention as may hereinafter appear will be best understood from a description of the accompanying drawings which illustrate various embodiments of my invention.

In the drawings, Fig. 1 is a side elevation of a coffee urn equipped with my invention.

Fig. 2 is a plan view of the improved type of burner I preferably employ.

Fig. 3 is a sectional view thereof taken along the line 3—3 of Fig. 2.

Fig. 4 is an end elevation illustrating the adjustable air intake for the mixing chamber of my improved burner.

In the drawings 12 generally indicates a normally closed cooking vessel, as specifically shown, a coffee urn. As hitherto stated my improved type of burner is particularly adapted for use in conjunction with thermostatic means suitably actuated by the conditions within the cooking vessel to control the supply of burning fluid thereto.

14 generally indicates the burner I preferably employ for heating the cooking vessel 12 and 16 the usual fuel supply conduits for said burner. 18 generally indicates a thermo-responsive valve for controlling the flow of burning fluid preferably interposed in said fuel supply line and preferably of the type specifically described and claimed in my co-pending application for Cooking Vessels filed of even date herewith, Serial No. 282,683.

In my preferred burner the gas supply line 20 terminates in the usual end 22 below said cooking vessel 12. Though any suitable type of means may be employed to vertically adjustably mount the burner 14 below the base of the cooking vessel 12, I preferably employ a hollow T-coupling having one T-arm 24 thereof attached to the end 22 of the fuel supply line and a plug 26, preferably conically headed, adjustably vertically contained in the other T-arm 28. It is obvious that the head 30 of the plug may be adjustably raised or lowered by varying the height of the end 20 of the supply line or if desired plugs 26 of different heights may be inserted within said arm. I provide a hollow annular burner plate 32 having the radial fuel openings 34 in the side wall 36 thereof. I provide a suitable base 38 for said burner plate 32 and I provide said burner plate 32 with a hollow central hole 40 to admit secondary air upwardly therethrough to provide as hitherto explained a down draft of secondary air effective with the usual updraft to provide a better burning efficiency for burners of this type. Said burner base 38 is provided on the base thereof with a suitable seat 44 for the reception of the head 30 of the plug 26. It is thus obvious that by varying the length of the plug the height of the burner plate 32 may be adjustably varied. I preferably provide in addition a primary air mixing chamber 46 attached to said base 38 and discharging within said hollow burner plate 32. In my preferred embodiment said primary air mixing chamber 46 comprises a horizontally extending Venturi shaped chamber attached to one side of said base 38, having the outlet 48 thereof discharging within said annular burner plate 32. The inlet end 52 of said Venturi shaped mixing chamber is provided with the central gas inlet 54 and the adjustable annular air inlet duct 56, provided with the louvre valve 58 to discharge axially within said inlet 52. The burning fluid conduit 16 is thus attached to the base 60 of the T-coupling and to the inlet 54 of said burner and preferably has interposed therein in the manner hitherto described the thermo-responsive valve 18. In the gas inlet 54 I preferably provide the usual gas nozzle 55.

In use the louvre valve 58 in the air mixing chamber 46 is opened to admit the desired amount of primary air to give a burning mixture of the desired consistency which is mixed in the Venturi shaped mixing chamber 46 with the gas or other burning fluid entering through the gas inlet 54. The Venturi-shape of the mixing chamber 46 provides a thorough mixture of air and gas in said chamber which is then discharged through the radial ducts 34 in the hollow burner plate 32. Secondary air is discharged upwardly through the central hole 40 of the burner plate 32 to expand radially outwardly over the burning gas jets projecting radially horizontally from the burner plate 32. The secondary air discharging through the hole 40 thus provides a down draft for the thorough consumption of the gaseous mixture which functions in combination with the usual up draft to provide in burners of this type a more perfect combustion of the gas or other burning fluid employed.

It is thus obvious that I have provided a novel type of preferably vertically adjustable and detachable burner for use in heating cooking vessels, provided with a novel type of Venturi primary air mixing chamber and a novel type of means to cause a mixture of up draft and down draft of the secondary air around the burning gaseous mixture.

It is understood that my invention is not limited to the specific embodiment shown and that various deviations may be made therefrom without departing from the spirit and scope of the appended claims.

What I claim is:

1. In combination, a normally closed cooking vessel having a heating liquid therein, a gas supply line terminating in the usual end below said cooking vessel, a T-coupling having a T-arm attached to said supply line end, a plug adjustably vertically mounted in the other T-arm, a thermo-responsive valve mechanism attached to said cooking vessel having a burning fluid inlet duct and a burning fluid outlet duct and a thermo-responsive portion extending within said cooking vessel, a line connecting the hollow T-coupling base with said valve inlet duct, a hollow removable annular burner plate mounted in spaced burning relationship to the base of said cooking vessel having radial fuel openings in the side wall thereof, a cylindrical seat on the base thereof for reception of said plug, a Venturi shaped air mixing chamber having the outlet thereof discharging into said annular burner plate, a gas inlet duct at the inlet end of said mixing chamber and an adjustable air inlet duct at said inlet and a pipe connecting the gas outlet duct in the valve mechanism with the gas inlet to said mixing chamber.

2. A vertically adjustable and detachable burner for use in heating cooking vessels comprising a gas supply line terminating in the usual end below said cooking vessel, a T-coupling having a T-arm attached to said supply line end, a plug adjustably vertically mounted in the other T-arm, a hollow annular burner plate having radial fuel openings in the side wall thereof, a base therefor having a seat therein for reception of said plug, a horizontally extending Venturi-shaped primary air mixing chamber attached to one side of said base having the outlet thereof discharging into said hollow annular burner plate, a gas inlet at the inlet end of said mixing chamber, an adjustable air inlet duct at said inlet and a pipe connecting the base of said T-coupling with the gas inlet of the mixing chamber.

3. A vertically adjustable and detachable burner for use in heating cooking vessels comprising a gas line terminating in the usual end below said cooking vessel, a T-coupling attached to said supply line end, a plug adjustably vertically mounted in said other T-arm, a hollow annular burner plate having radial fuel openings in the side wall thereof, a base for said burner plate having means to discharge secondary air upwardly centrally of said burner plate and a hole for said plug in the base thereof, a primary air mixing chamber attached to said base and discharging into said burner plate having an adjustable primary air inlet therein and a gas inlet connected to the base of the T-coupling.

4. A vertically adjustable and detachable burner for use in heating cooking vessels comprising a gas line terminating in the usual end below said cooking vessel, a T-coupling having a T-arm attached to said supply line end, a plug vertically adjustably mounted in the other T-arm, a burner head having a base having a hole therein for mounting on said plug and a gas inlet connected to the base of the T-coupling.

In testimony whereof I affix my signature.

FREDERICK R. MOTT.